United States Patent
Yoon et al.

(10) Patent No.: US 8,509,441 B2
(45) Date of Patent: Aug. 13, 2013

(54) RADIO FREQUENCY IDENTIFICATION SYSTEM AND AUTHENTICATION METHOD THEREOF

(75) Inventors: Bong No Yoon, Gyeonggi-do (KR); Hyun Seok Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 575 days.

(21) Appl. No.: 12/813,078

(22) Filed: Jun. 10, 2010

(65) Prior Publication Data

US 2010/0316220 A1    Dec. 16, 2010

(30) Foreign Application Priority Data

Jun. 10, 2009    (KR) .................. 10-2009-0051252

(51) Int. Cl.
*H04L 9/22* (2006.01)
(52) U.S. Cl.
USPC ............................................. 380/270; 380/44
(58) Field of Classification Search
USPC .................................................. 380/270, 44
See application file for complete search history.

(56) References Cited

U.S. PATENT DOCUMENTS

| | | | | |
|---|---|---|---|---|
| 5,444,781 A * | 8/1995 | Lynn et al. | ...................... | 380/46 |
| 5,745,522 A * | 4/1998 | Heegard | ......................... | 380/46 |
| 2003/0039301 A1 * | 2/2003 | Bradley | ....................... | 375/147 |
| 2007/0047623 A1 * | 3/2007 | Eun et al. | ...................... | 375/130 |
| 2010/0127831 A1 * | 5/2010 | Cha et al. | ..................... | 340/10.1 |
| 2011/0133883 A1 * | 6/2011 | Pang et al. | .................... | 340/5.8 |

* cited by examiner

*Primary Examiner* — Kambiz Zand
*Assistant Examiner* — Aubrey Wyszynski
(74) *Attorney, Agent, or Firm* — The Farrell Law Firm, P.C.

(57) ABSTRACT

A Radio Frequency Identification (RFID) system and method are provided that includes a reader and a tag which share a predetermined secret key. The reader transmits an authentication request random number to the tag. The reader and the tag generate a Pseudorandom Noise (PN) sequence formed of a series of binary codes from an exclusive disjunction of the authentication request random number and the predetermined secret key. The tag produces an authentication response random number by performing a predetermined conversion operation for the PN sequence and transmits the authentication response random number to the reader. The reader authenticates the tag by analyzing the PN sequence and the authentication response random number.

28 Claims, 5 Drawing Sheets

RADIO FREQUENCY IDENTIFICATION SYSTEM AND AUTHENTICATION METHOD THEREOF

PRIORITY

This application claims priority under 35 U.S.C. 119(a) to an application filed in the Korean Intellectual Property Office on Jun. 10, 2009, and assigned serial number 10-2009-0051252, the contents of which are incorporated herein by reference.

BACKGROUND OF THE INVENTION

1. Field of the Invention

The present invention relates generally to a communication system and a communication method thereof and, more particularly, to a radio frequency identification system including a reader and a tag, which share a predetermined secret key, and an authentication method thereof.

2. Description of the Related Art

In standard Radio Frequency Identification (RFID) technology, a tag includes specific tag information sent to a reader located within a certain distance. A reader can interpret tag information received from a number of tags, which are located in a proper range and even on the move, without contact with them. RFID systems are widely used in a variety of fields, such as payment by mobile phones, transportation payments, asset management and retail sales, product tracking, transportation and logistics, animal identification, inventory systems, libraries, human identification, and the like. Particularly, in most RFID systems, a tag or a reader is incorporated into communication terminals such as mobile devices.

A conventional RFID system may be susceptible to illicit attacks for gathering and cloning tag information by intervening upon a wireless communication between a reader and a tag. Therefore, in order to maintain security for tag information, a reader normally performs authentication of a tag before interpreting tag information. Specifically, a reader interprets tag information only after succeeding in authentication of a tag. A reader and a tag share at least one secret key and also exchange at least one random number so that a reader can authenticate a tag.

BRIEF SUMMARY OF THE INVENTION

The present invention has been made to address at least the above problems and/or disadvantages and to provide at least the advantages described below. Accordingly, an aspect of the present invention provides a method for authentication of a reader and a tag in a radio frequency identification system.

According to one aspect of the present invention, a method is provided for authentication of a reader and a tag sharing a predetermined secret key in an RFID system. The reader transmits an authentication request random number to the tag. The reader and the tag generate a Pseudorandom Noise (PN) sequence formed of a series of binary codes from an exclusive disjunction of the authentication request random number and the predetermined secret key. The tag produces an authentication response random number by performing a predetermined conversion operation for the PN sequence and transmits the authentication response random number to the reader. The reader authenticates the tag by analyzing the PN sequence and the authentication response random number.

According to another aspect of the present invention, a radio frequency identification system is provided sharing a predetermined secret key. The system includes a tag configured to store the predetermined secret key, and to generate a PN sequence formed of a series of binary codes from an exclusive disjunction of an authentication request random number and the predetermined secret key when receiving the authentication request random number. The tag is also configured to produce an authentication response random number by performing a predetermined conversion operation for the PN sequence, and to transmit the authentication response random number. The system also includes a reader configured to store the predetermined secret key, to transmit the authentication request random number, to generate the PN sequence formed of a series of binary codes from the exclusive disjunction of the authentication request random number and the predetermined secret key, and to authenticate the tag by analyzing the PN sequence and the authentication response random number when receiving the authentication response random number.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Although the drawings represent embodiments of the invention, the drawings are not necessarily to scale and certain features may be exaggerated or omitted in order to better illustrate and explain the present invention.

Figure 1:
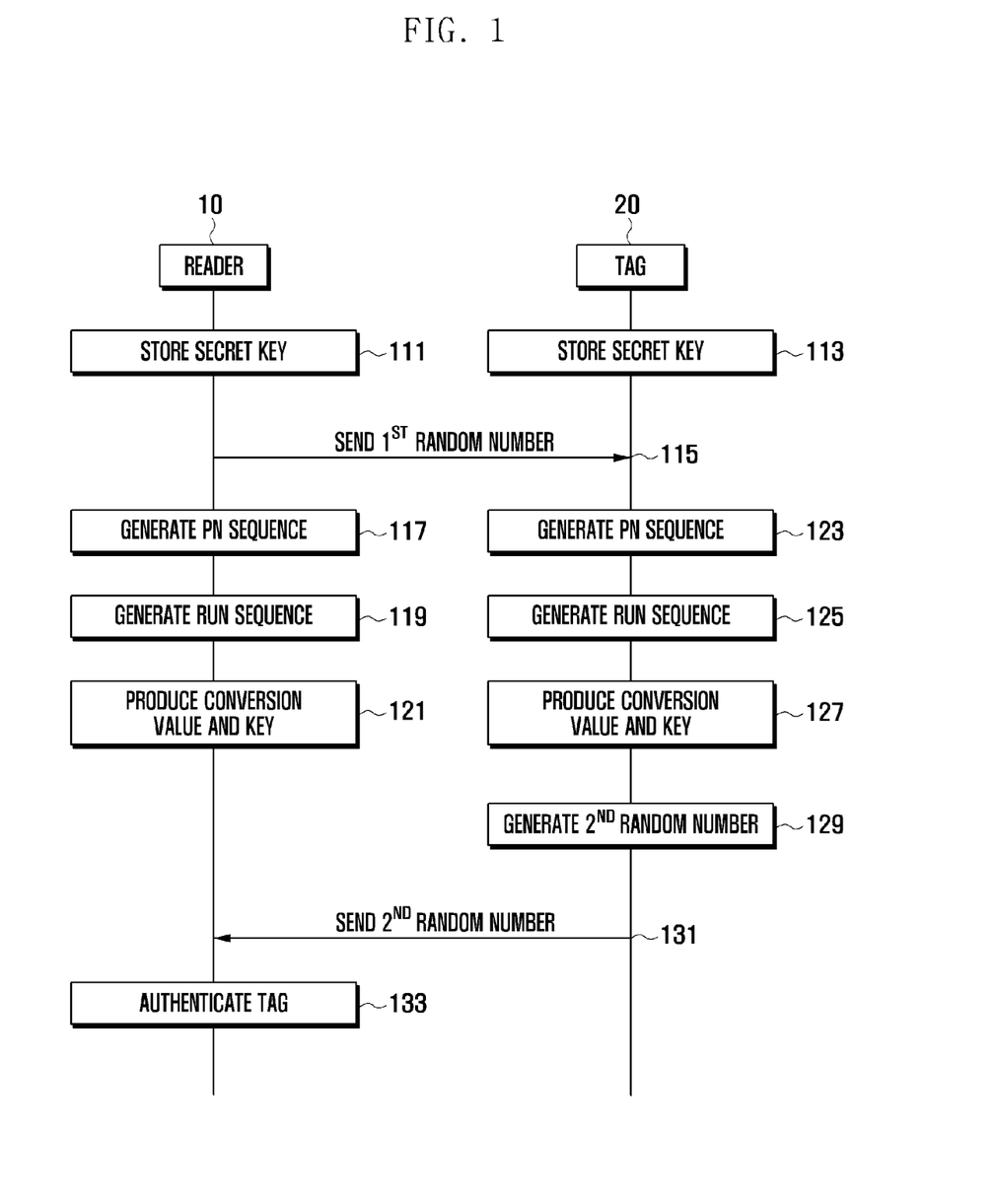
FIG. 1 is a flow diagram illustrating a signal flow in a radio frequency identification system, according to an embodiment of the present invention.

FIG. 1 is a flow diagram illustrating a signal flow in a radio frequency identification system, according to an embodiment of the present invention.

The RFID system includes a reader 10 and a tag 20. When the reader 10 authenticates the tag 20, the reader 10 can interpret tag information of the tag 20 located within a certain distance. Specifically, the tag 20 stores specific tag information and can transmit it to the reader 10 located within a certain distance. At least one of the reader 10 and the tag 20 may be incorporated into communication terminals, such as mobile devices.

For mutual authentication in this RFID system, the reader 10 stores a secret key in step 111, and the tag 20 stores the same secret key in step 113. Specifically, the reader 10 and the tag 20 share a predetermined particular secret key. Additionally, the reader 10 generates a first random vector, which may also be referred to as a first challenge, and then transmits the first random vector to the tag 20 in step 115. The reader 10 detects the tag 20 in a given range and then sends the first random vector as an authentication request random number for authentication of the tag 20. Specifically, the reader 10 and the tag 20 share an authentication request random number.

After transmitting an authentication request random number, the reader 10 generates a PN sequence by using both the authentication request random number and the secret key in step 117. The reader 10 calculates the exclusive disjunction (also referred to as an exclusive or, and symbolized XOR) of the authentication request random number and the secret key and then applies the exclusive disjunction to the Linear Feedback Shift Register (LFSR) function in order to generate the PN sequence. The PN sequence is composed of a series of binary codes. Additionally, the reader 10 generates a run sequence from the PN sequence in step 119. Specifically, the reader 10 counts at least one run code, which indicates a continuous arrangement of the same binary codes in the PN sequence, and then generates the run sequence formed of a series of run codes. By using the run sequence, the reader 10 converts the exclusive disjunction into a conversion value and converts the secret key into a conversion key in step 121. Specifically, the reader 10 produces the conversion value through the conversion operation for the exclusive disjunction by using the run sequence, and produces the conversion key through the conversion operation for the secret key by using the run sequence. The conversion operation may include at least one of the rotation operation and the truncation operation.

When receiving the authentication request random number, the tag 20 generates a PN sequence by using both the authentication request random number and the secret key in step 123. The tag 20 calculates the exclusive disjunction of the authentication request random number and the secret key and then applies it to the LFSR function in order to generate the PN sequence. The PN sequence is composed of a series of binary codes. Additionally, the tag 20 generates a run sequence from the PN sequence in step 125. Specifically, the tag 20 counts at least one run code, which is a continuous arrangement of the same binary codes in the PN sequence, and then generates the run sequence formed of a series of run codes. By using the run sequence, the tag 20 converts the exclusive disjunction into a conversion value and converts the secret key into a conversion key in step 127. Specifically, the tag 20 produces the conversion value through the conversion operation for the exclusive disjunction by using the run sequence, and produces the conversion key through the conversion operation for a secret key by using the run sequence. The conversion operation may include at least one of the rotation operation and the truncation operation.

The tag 20 then calculates a second random vector, which may also be referred to as a second challenge, from the scalar product of the conversion value and the conversion key in step 129. The tag 20 selectively adds a noise vector to the scalar product of the conversion value and the conversion key and then produces the second random vector as an authentication response random number. The tag 20 transmits the authentication response random number to the reader 10 in step 131. The tag 20 detects the reader 10 in a given range through the authentication request random number and, in response to it, sends the authentication response random number to the reader 10. When receiving the authentication response random number, the reader 10 authenticates the tag 20 by comparing the scalar product of the conversion value and the conversion key with the authentication response random number in step 133. The reader 10 may compare the scalar product of the conversion value and the conversion key with that of the authentication response random number and then conversion key, and then may authenticate the tag 20 by using the comparison result.

The reader 10 and the tag 20 in the RFID system can improve security by performing the conversion operation using a PN sequence. It may seem to an attacker that a run sequence obtained from a PN sequence is a random sequence. Specifically, since the reader 10 and the tag 20 perform the conversion operation by using run codes of a run sequence as a factor, an attacker may fail to use an authentication response random number even though he or she illicitly obtains it. Therefore, it is possible not only to prevent an attacker from intervening in a wireless communication between the reader 10 and the tag 20, but also to improve the security of the tag information.

Figure 2:
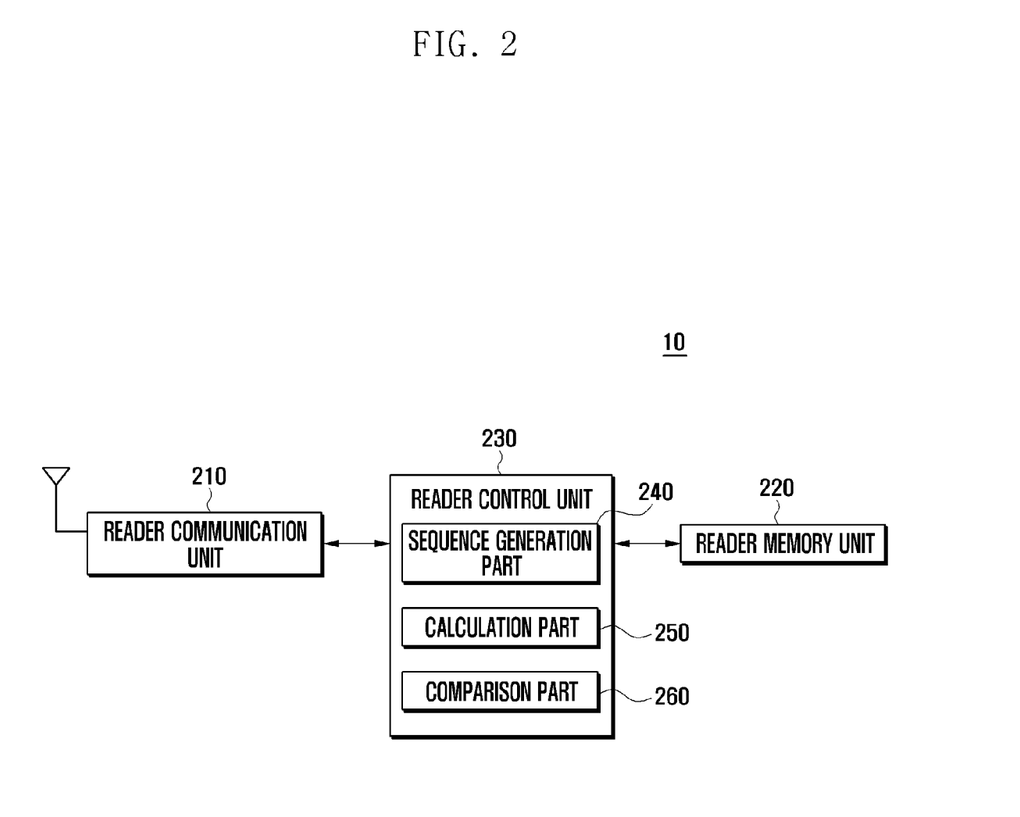
FIG. 2 is a block diagram illustrating a configuration of a reader in a radio frequency identification system, according to an embodiment of the present invention.
Figure 3:
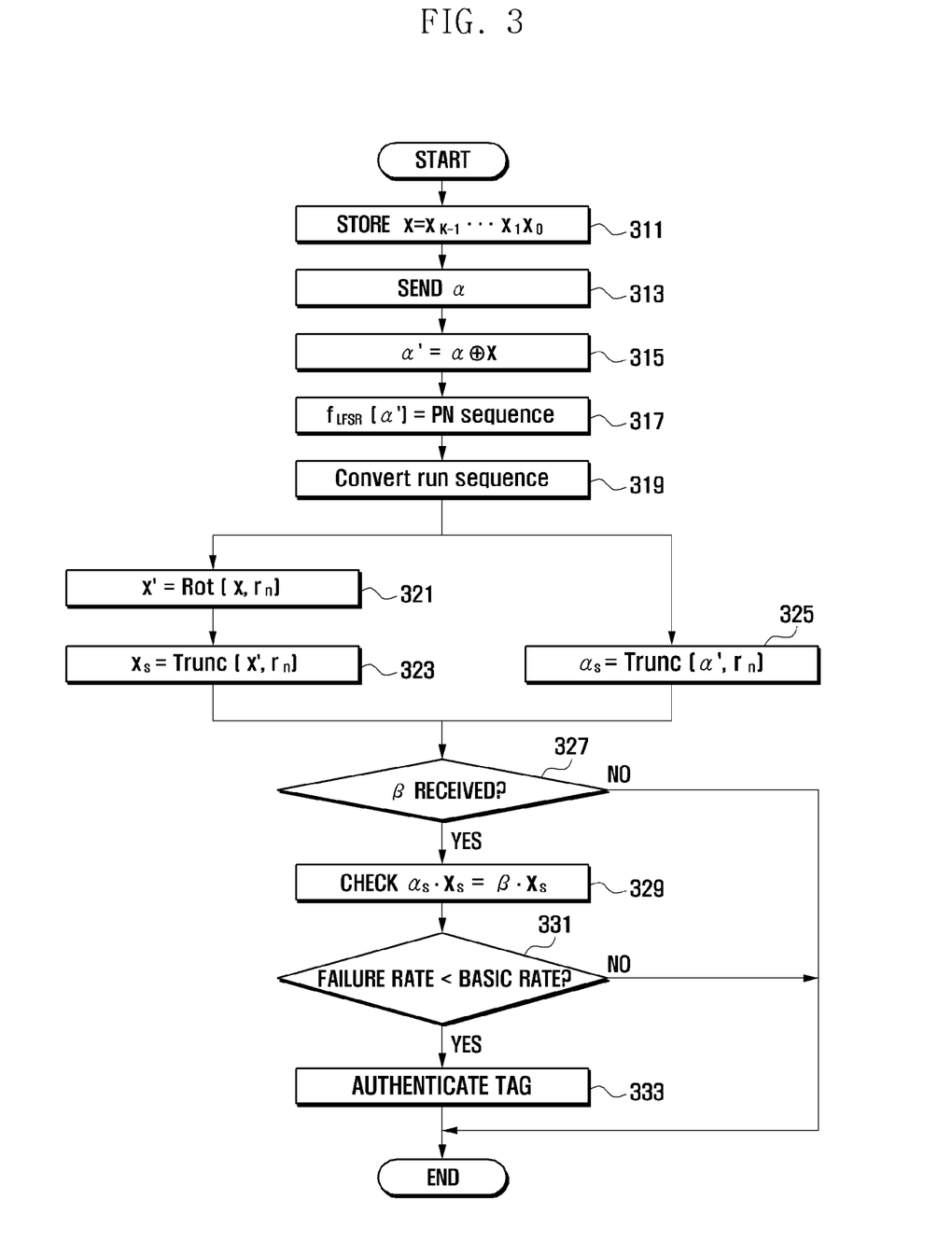
FIG. 3 is a flow diagram illustrating an authentication method of a reader in a radio frequency identification system, according to an embodiment of the present invention.
Figure 4:
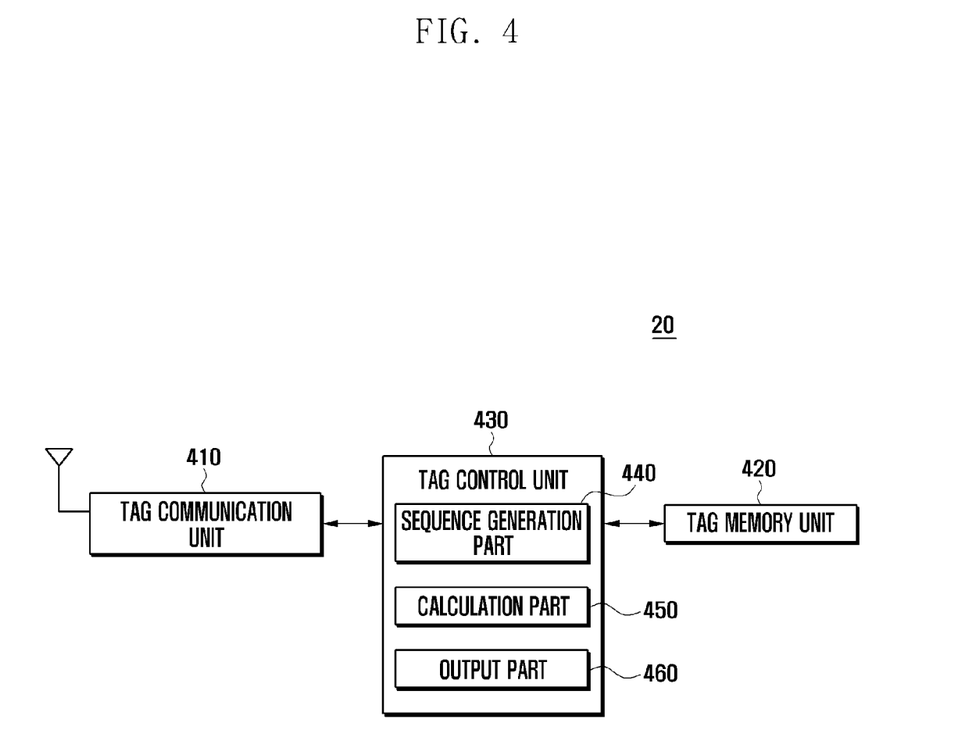
FIG. 4 is a block diagram illustrating a configuration of a tag in a radio frequency identification system, according to an embodiment of the present invention.
Figure 5:
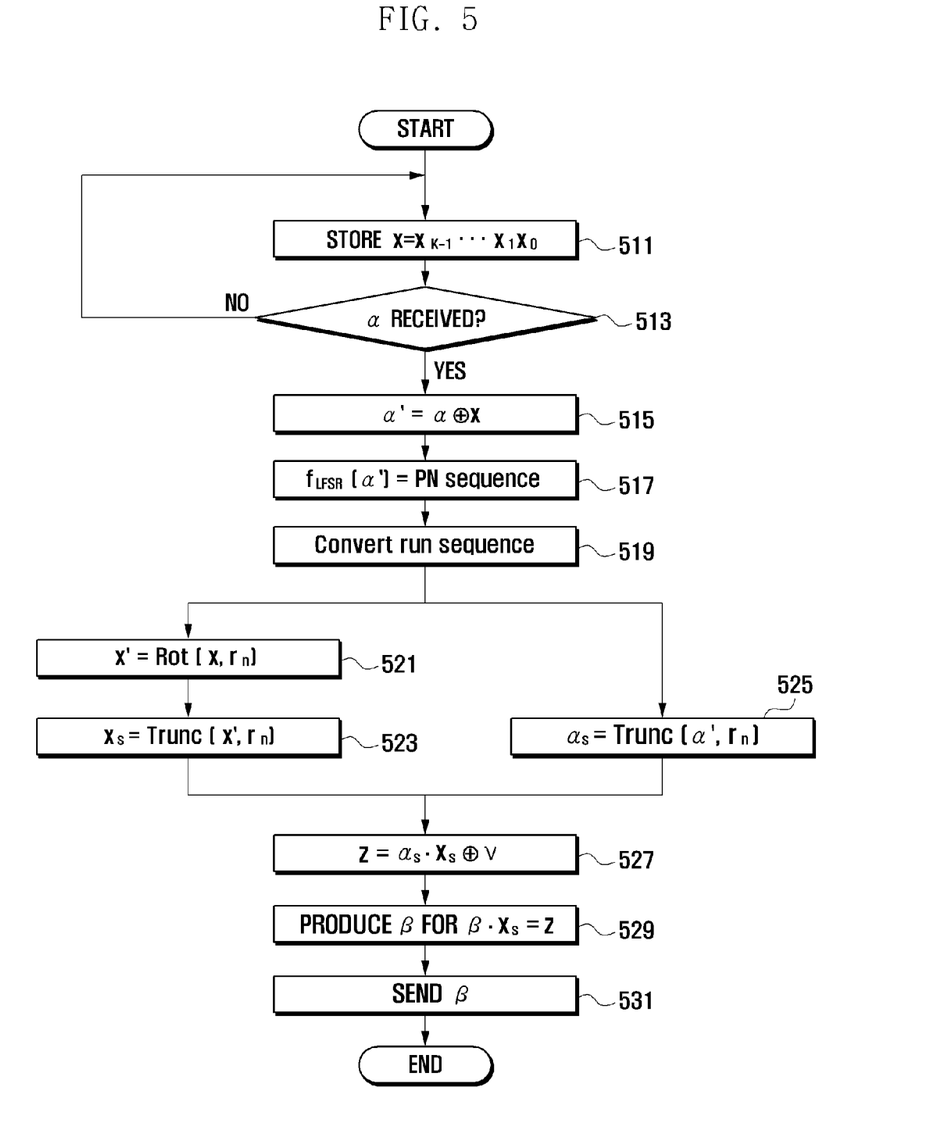
FIG. 5 is a flow diagram illustrating an authentication method of a tag in a radio frequency identification system, according to an embodiment of the present invention.

FIGS. 2 and 3 are views respectively illustrating a configuration and running process of a reader. Similarly, FIGS. 4 and 5 are views respectively illustrating a configuration and running process of a tag.

FIG. 2 is a block diagram illustrating a configuration of a reader in a radio frequency identification system, according to an embodiment of the present invention.

The reader 10 in the RFID system includes a reader communication unit 210, a reader memory unit 220, and a reader control unit 230.

The reader communication unit 210 performs an RF communication function for a particular RFID process of the reader 10. Specifically, the reader communication unit 210 processes a signal and then sends it to the tag 20, or receives a signal from the tag 20 and then processes it.

The reader memory unit 220 may be formed of a program memory region and a data memory region. The program memory region stores a variety of programs used for controlling operations of the reader 10. In an embodiment of the present invention, the program memory region may store a particular program for authentication of the tag 20. The data memory region stores data created while such programs are running. More particularly, in an embodiment of the present invention, the reader memory unit 220 stores a predetermined secret key. Also, the reader memory unit 220 stores the rate of authentication failure and the basic rate. These rates are compared with each other and used to determine whether to authenticate the tag 20.

The reader control unit 230 performs controls the whole operation of the reader 10. In an embodiment of the present invention, the reader control unit 230 may perform the authentication of the tag 20. Specifically, the reader control unit 230 sends the authentication request random number through the reader communication unit 210. Also, the reader control unit 230 receives the authentication response random number through the reader communication unit 210 and then authenticates the tag 20 by using the received authentication response random number. In particular, the reader control unit 230 includes a sequence generation part 240, a calculation part 250, and a comparison part 260. The sequence generation part 240 calculates the exclusive disjunction of the authentication request random number and the secret key, and then generates the PN sequence by applying the exclusive disjunction to the LFSR function. Additionally, the sequence generation part 240 generates the run sequence by counting run codes in the PN sequence. The calculation part 250 produces the conversion value by performing a given conversion operation for the exclusive disjunction through the run sequence, and also produces the conversion key by performing a given conversion operation for the secret key through the run sequence. The comparison part 260 compares the scalar product of the conversion value and the conversion key with that of the authentication response random number and the conversion key, and then authenticates the tag 20 by using the comparison result. The comparison part 260 may update authentication failure rate by comparing it with the basic rate.

FIG. 3 is a flow diagram illustrating an authentication method of a reader in a radio frequency identification system, according to an embodiment of the present invention.

Referring to FIG. 3, an authentication method of the reader 10 begins with the storing of a secret key in the reader memory unit 220 in step 311. The secret key is predetermined to be shared with the specific tag 20. In addition, the secret key is composed of k-bit key codes as expressed in Equation (1) below.

$$X = X_{k-1} \ldots X_1 X_0 \tag{1}$$

Here, X denotes the secret key, and $X_{k-1}$ denotes a key code.

The reader control unit 230 sends the authentication request random number in step 313. The reader control unit 230 arbitrarily generates the authentication request random number from k-bit binary codes and then sends it. The reader control unit 230 produces a logic value through the exclusive disjunction of the authentication request random number and the secret key in step 315. The reader control unit 230 may calculate the logic value as expressed in Equation (2) below.

$$\alpha' = \alpha \oplus X \tag{2}$$

Here, $\alpha$ denotes the authentication request random number, and $\alpha'$ denotes the logic value.

The reader control unit 230 applies the logic value to the LFSR function in step 317. The reader control unit 230 produces the PN sequence formed of a series of binary codes. The reader control unit 230 may generate the PN sequence as expressed in Equation (3) below. Then the reader control unit 230 generates the run sequence by counting run codes in consecutive order from the PN sequence in step 319. The reader control unit 230 may generate the run sequence formed of n-run codes as expressed in Equation (4) below.

$$f_{LFSR}(\alpha') = PN \text{ sequence} \tag{3}$$

$$\text{run sequence} = \{r_1, r_2, \ldots, r_n\} \tag{4}$$

Here, $r_n$ denotes the run code.

For example, the reader control unit 230 may generate a PN sequence '0001001101011110'. Then the reader control unit 230 produces a run code '3' by counting '000', a run code '1' by counting '1', a run code '2' by counting '00', a run code '2' by counting '11', a run code '1' by counting '0', a run code '1' by counting 1', a run code '1' by counting '0', a run code '4' by counting '1111', and a run code '1' by counting '0'. Additionally, the reader control unit 230 may generate a run sequence {3, 1, 2, 2, 1, 1, 1, 4, 1} which corresponds to an arrangement of run codes.

The reader control unit 230 performs a rotation operation for the secret key by using the run sequence, and thus converts the secret key into a rotation key in step 321. Specifically, the reader control unit 230 produces the rotation key by rotating the order of key codes of the secret key by the run code. The reader control unit 230 may produce the rotation key as expressed in Equation (5) below. Additionally, the reader control unit 230 performs the truncation operation for the rotation key by using the run sequence, and thus converts the rotation key into the conversion key in step 323. Specifically, the reader control unit 230 produces the conversion key by truncating key codes of the rotation key by the run code. The reader control unit 230 may produce the conversion key as expressed in Equation (6) below.

$$X' = \text{Rot}(X, r_n) \tag{5}$$

Here, X' denotes the rotation key.

$$X_S = \text{Trunc}(X', r_n) \tag{6}$$

Here, $X_S$ denotes the conversion key.

For example, the reader control unit 230 performs the rotation operation for a secret key '10011100' by a run code '3'. Specifically, by rotating the last three key codes '100' of the secret key to the front of the secret key, a rotation key '10010011' can be obtained. Furthermore, the reader control unit 230 performs the truncation operation for a rotation key '10010011' by the run code '3'. Specifically, by truncating the last three key codes '011' of the rotation key, a conversion key '10010' can be obtained.

In addition, the reader control unit 230 performs the truncation operation for the logic value by using the run sequence, and thus converts the logic value into the conversion value in step 325. Specifically, the reader control unit 230 produces the conversion value by truncating binary codes of the logic value by the run code. The control unit 230 may produce the conversion value as expressed in Equation (7) below.

$$\alpha_S = \text{Trunc}(\alpha', r_n) \tag{7}$$

Here, $\alpha_S$ denotes the conversion value.

When the authentication response random number is received from the tag 20, the reader control unit 230 detects it in step 327 and then compares the scalar product of the conversion value and the conversion key with the authentication response random number in step 329. The reader control unit 230 may compare the scalar product of the conversion value and the conversion key with that of the authentication response random number and the conversion key as expressed in Equation (8) below. Specifically, the reader control unit 230 checks whether both scalar products are equal to each other. The reader control unit 230 updates the rate of authentication failure. If both scalar products are not equal, the reader control unit 230 increases the failure rate. If both scalar products are equal, the reader control unit 230 decreases the failure rate.

$$\alpha_{X'} \cdot X_S = \beta \cdot X_S \tag{8}$$

Here, $\beta$ denotes the authentication response random number.

The reader control unit 230 compares the authentication failure rate of the tag 20 with a predetermined basic rate in step 331. The reader control unit 230 may compare the authentication failure rate, resulted from a times of authentication processes performed between the reader 10 and the tag 20, with the predetermined basic rate as expressed in Equation (9) below. Specifically, the reader control unit 230 determines whether the failure rate is lower than the predetermined basic rate. If the failure rate of the tag 20 is lower than the predetermined basic rate, the reader control unit 230 authenticates the tag 20 in step 333. The reader control unit 230 can then interpret tag information of the tag 20.

$$\eta \square [0, \tfrac{1}{2}] \tag{9}$$

The '$\square$' indicates the IN operator for specifying a range of sequential numbers to search. That is, Equation (9) means that $\eta$ is a certain number of 0 to ½.

Here, $\eta$ denotes the basic rate.

If the failure rate of the tag 20 is not lower than the predetermined basic rate, the reader control unit 230 does not authenticate the tag 20. The reader control unit 230 does not interpret tag information of the tag 20.

For example, if the predetermined basic rate is 50%, the reader control unit 230 authenticates the tag 20 when the failure rate of the tag 20 is lower than 50%. The reader control unit 230 does not authenticate the tag 20 when the failure rate of the tag 20 is not lower than 50%.

Although it is determined in step 329 that both scalar products are not equal, the reader control unit 230 may authenticate the tag 20. Similarly, although it is determined that both scalar products are equal, the reader control unit 230 may not authenticate the tag 20. Thus, authentication is dependent upon the failure rate of the tag 20.

FIG. 4 is a block diagram illustrating a configuration of a tag in a radio frequency identification system, according to an embodiment of the present invention.

The tag 20 in the RFID system includes a tag communication unit 410, a tag memory unit 420, and a tag control unit 430.

The tag communication unit 410 performs an RF communication function for a particular RFID process of the tag 20. Specifically, the tag communication unit 410 processes a signal and then sends it to the reader 10, or receives a signal from the reader 10 and then processes it.

The tag memory unit 420 may be formed of a program memory region and a data memory region. The program memory region stores a variety of programs used for controlling operations of the tag 20. In an embodiment of the present invention, the program memory region may store a particular program for authentication of the tag 20. The data memory region stores data, e.g., tag information, created while such programs are running. In an embodiment of the present invention, the tag memory unit 420 stores the predetermined secret key.

The tag control unit 430 performs controls the whole operation of the tag 20. In an embodiment of the present invention, the tag control unit 430 may request the reader 10 to authenticate the tag 20. Specifically, when receiving the authentication request random number through the tag communication unit 410, the tag control unit 430 processes the authentication request random number and then generates the authentication response random number. Also, the tag control unit 430 sends the authentication response random number through the tag communication unit 410. The tag control unit 430 makes a request for authentication to the reader 10 through the authentication response random number. The tag control unit 430 includes a sequence generation part 440, a calculation part 450, and an output part 460. The sequence generation part 440 calculates the exclusive disjunction of the authentication request random number and the secret key, and then generates the PN sequence by applying the exclusive disjunction to the LFSR function. Additionally, the sequence generation part 440 generates the run sequence by counting run codes in the PN sequence. The calculation part 450 produces the conversion value by performing a given conversion operation for the exclusive disjunction through the run sequence, and also produces the conversion key by performing a given conversion operation for the secret key through the run sequence. The output part 460 produces the authentication response random number from the scalar product of the conversion value and the conversion key. The output part 460 selectively adds a noise vector to the scalar product of the conversion value and the conversion key and then produces the authentication response random number.

FIG. 5 is a flow diagram illustrating an authentication method of a tag in a radio frequency identification system, according to an embodiment of the present invention.

An authentication method of the tag 20 begins with storing the secret key in the tag memory unit 420 in step 511. The secret key is predetermined to be shared with the specific reader 10. The secret key is composed of k-bit key codes as expressed in Equation (10) below.

$$X = X_{k-1} \ldots X_1 X_0 \quad (10)$$

Here, X denotes the secret key, and $X_{k-1}$ denotes a key code.

When receiving the authentication request random number through the tag communication unit 410, the tag control unit 430 detects the authentication request random number in step 513, and produces a logic value through the exclusive disjunction of the authentication request random number and the secret key in step 515. The authentication request random number is composed of k-bit binary codes. Also, the tag control unit 430 may calculate the logic value as expressed in Equation (11) below.

$$\alpha' = \alpha \oplus X \quad (11)$$

Here, $\alpha$ denotes the authentication request random number, and $\alpha'$ denotes the logic value.

The tag control unit 430 applies the logic value to the LFSR function in step 517. Through this application, the tag control unit 430 produces the PN sequence formed of a series of binary codes. The tag control unit 430 may generate the PN sequence as expressed in Equation (12) below. The tag control unit 430 generates the run sequence by counting run codes in consecutive order from the PN sequence in step 519. The tag control unit 430 may generate the run sequence formed of n-run codes as expressed in Equation (13) below.

$$f_{LFSR}(\alpha') = PN \text{ sequence} \quad (12)$$

$$\text{run sequence} = \{r_1, r_2, \ldots, r_n\} \quad (13)$$

Here, $r_n$ denotes the run code.

For example, the tag control unit 430 may generate a PN sequence '0001001101011110'. Then the tag control unit 430 produces a run code '3' by counting '000', a run code '1' by counting '1', a run code '2' by counting '00', a run code '2' by counting '11', a run code '1' by counting '0', a run code 1' by counting '1', a run code '1' by counting '0', a run code '4' by counting '1111', and a run code '1' by counting '0'. Additionally, the tag control unit 430 may generate a run sequence {3, 1, 2, 2, 1, 1, 1, 4, 1} which corresponds to an arrangement of run codes.

The tag control unit 430 performs the rotation operation for the secret key by using the run sequence, and thus converts the secret key into a rotation key in step 521. Specifically, the tag control unit 430 produces the rotation key by rotating the order of key codes of the secret key by the run code. The tag control unit 430 may produce the rotation key as expressed in Equation (14) below. Additionally, the tag control unit 430 performs the truncation operation for the rotation key by using the run sequence, and thus converts the rotation key into the conversion key in step 523. Specifically, the tag control unit 430 produces the conversion key by truncating key codes of the rotation key by the run code. The tag unit 430 may produce the conversion key as expressed in Equation (15) below.

$$X' = \text{Rot}(X, r_n) \quad (14)$$

Here, X' denotes the rotation key.

$$X_S = \text{Trunc}(X', r_n) \quad (15)$$

Here, $X_S$ denotes the conversion key.

For example, the tag control unit 430 performs the rotation operation for a secret key '10011100' by a run code '3'. Specifically, by rotating the last three key codes '100' of a secret key to the front of a secret key, a rotation key '10010011' can be obtained. Furthermore, the tag control unit 430 performs the truncation operation for a rotation key '10010011' by a run code '3'. Specifically, by truncating the last three key codes '011' of a rotation key, a conversion key '10010' can be obtained.

The tag control unit 430 performs the truncation operation for the logic value by using the run sequence, and thus converts the logic value into the conversion value in step 525. Specifically, the tag control unit 430 produces the conversion value by truncating binary codes of the logic value by the run code. The tag unit 430 may produce the conversion value as expressed in Equation (16) below.

$$\alpha_S = \text{Trunc}(\alpha', r_n) \quad (16)$$

Here, $\alpha_S$ denotes the conversion value.

The tag control unit 430 calculates a response value from the scalar product of the conversion value and the conversion key in step 527. The tag control unit 430 may produce the response value by selectively adding a noise vector. Specifically, the tag control unit 430 calculates the response value through the exclusive disjunction of the above scalar product and the noise vector. The tag control unit 430 may calculate the response value as expressed in Equation (17) below. Additionally, the tag memory unit 420 may store a predetermined noise addition rate as expressed in Equation (18) below. Specifically, considering such a noise addition rate, the tag control unit 430 may selectively add the noise vector to the scalar product of the conversion value and the conversion key and then produce the response value.

$$Z = \alpha_S \cdot X_S \oplus V \quad (17)$$

Here, Z denotes the response value, and V denotes the noise vector.

$$\eta \square [0, \tfrac{1}{2}] \quad (18)$$

The '$\square$' indicates the IN operator for specifying a range of sequential numbers to search. That is, Equation (18) means that $\eta$ is a certain number of 0 to ½.

Here, $\eta$ denotes the noise addition rate, which may be the same as the predetermined basic rate of the reader 10.

For example, the tag control unit 430 updates the noise addition rate, resulted from $\alpha$ times of former authentication processes, in the tag memory unit 420. Additionally, the tag control unit 430 may add the noise vector to the scalar product of the conversion value and the conversion key so that the noise addition rate may remain under 50%, for example.

The tag control unit 430 produces the authentication response random number from the response value in step 529. Specifically, the tag control unit 430 produces the authentication response random number so that the response value may be equal to the scalar product of the conversion key and the authentication response random number. The tag control unit 430 produces the authentication response random number in order to meet a specific condition as expressed in Equation (19) below. Then the tag control unit 430 sends the authentication response random number to the reader 10 in step 531.

$$\beta \cdot X_S = Z \quad (19)$$

Here, $\beta$ denotes the authentication response random number.

As described herein, the RFID system of the present invention can improve security between the reader and the tag through the conversion operation using a PN sequence. Thus, it may seem to an attacker that a run sequence obtained from the PN sequence is a random sequence. Specifically, since the reader and the tag perform the conversion operation by using run codes of a run sequence as a factor, an attacker may fail to use an authentication response random number even though he or she illicitly obtains it. Therefore, it is possible not only to prevent an attacker from intervening in a wireless communication between the reader and the tag, but also to improve the security of tag information.

While the present invention has been shown and described with reference to certain embodiments thereof, it will be understood by those skilled in the art that various changes in form and detail may be made therein without departing from the spirit and scope of the invention as defined by the appended claims.

What is claimed is:

1. A method for authenticating a tag of a reader in a radio frequency identification system sharing a predetermined secret key, the method comprising the steps of:
    transmitting an authentication request random number to the tag;
    generating a Pseudorandom Noise (PN) sequence formed of a series of binary codes from an exclusive disjunction of the authentication request random number and the predetermined secret key; and
    authenticating, when an authentication response random number produced by performing a predetermined conversion operation for the PN sequence is received from the tag, the tag by analyzing the PN sequence and the authentication response random number.

2. The method of claim 1, wherein authenticating the tag comprises performing the predetermined conversion operation for the PN sequence and performing a comparison with the authentication response random number.

3. The method of claim 2, wherein performing the comparison with the authentication response random number comprises:
    generating a run sequence by counting at least one run code which indicates a continuous arrangement of a same binary code in the PN sequence; and
    converting the exclusive disjunction and the predetermined secret key into a conversion value and a conversion key, respectively, by performing the predetermined conversion operation together with the run sequence.

4. The method of claim 2, wherein generating the PN sequence comprises generating the PN sequence by applying the exclusive disjunction to a Linear Feedback Shift Register (LFSR) function.

5. The method of claim 3, wherein the predetermined conversion operation comprises a rotation operation, and wherein performing the predetermined conversion operation comprises producing a rotation key by performing the rotation operation for the predetermined secret key by the run sequence in accordance with the following equation:

$$X' = \text{Rot}(X, r_n)$$

where X' denotes the rotation key, X denotes the predetermined secret key, and $r_n$ denotes the run code.

6. The method of claim 5, wherein:
    the predetermined conversion operation further comprises a truncation operation;
    the predetermined conversion operation further comprises producing the conversion value by performing the truncation operation for the exclusive disjunction by the run sequence in accordance with the following equation:

$$\alpha_S = \text{Trunc}(\alpha', r_n)$$

where $\alpha_S$ denotes the conversion value, and $\alpha'$ denotes the exclusive disjunction; and performing the predetermined conversion operation further comprises producing the conversion key by performing the truncation operation for the rotation key by the run sequence in accordance with the following equation:

$$X_S = \mathrm{Trunc}(X', r_n)$$

where $X_S$ denotes the conversion key.

7. The method of claim 6, wherein the tag produces the authentication response random number so that a scalar product of the authentication response random number and the conversion key is equal to a scalar product of the conversion value, the conversion key and a noise vector in accordance with the following equation:

$$\alpha_S \cdot X_S \oplus V = \beta \cdot X_S$$

where V denotes the noise vector, and $\beta$ denotes the authentication response random number.

8. The method of claim 7, wherein performing the comparison with the authentication response random number further comprises checking whether the scalar product of the conversion value and the conversion key is equal to the scalar product of the authentication response random number and the conversion key in accordance with the following equation:

$$\alpha_{X'} \cdot X_S = \beta X_S.$$

9. A method for authentication to a reader of a tag in a radio frequency identification system sharing a predetermined secret key, the method comprising the steps of:
generating, when an authentication request random number is received from the reader, a Pseudorandom Noise (PN) sequence formed of a series of binary codes from an exclusive disjunction of the authentication request random number and the predetermined secret key;
producing an authentication response random number by performing a predetermined conversion operation for the PN sequence; and
transmitting the authentication response random number to the reader.

10. The method of claim 9, wherein producing the authentication response random number comprises:
generating a run sequence by counting at least one run code which indicates a continuous arrangement of a same binary code in the PN sequence; and
converting the exclusive disjunction and the predetermined secret key into a conversion value and a conversion key, respectively, by performing the predetermined conversion operation together with the run sequence.

11. The method of claim 10, wherein generating the PN sequence comprises generating the PN sequence by applying the exclusive disjunction to a Linear Feedback Shift Register (LFSR) function.

12. The method of claim 10, wherein the predetermined conversion operation comprises a rotation operation, and wherein performing the predetermined conversion operation comprises producing a rotation key by performing the rotation operation for the predetermined secret key by the run sequence in accordance with the following equation:

$$X' = \mathrm{Rot}(X, r_n)$$

where $X'$ denotes the rotation key, X denotes the predetermined secret key, and $r_n$ denotes the run code.

13. The method of claim 10, wherein:
the predetermined conversion operation further comprises a truncation operation;
performing the predetermined conversion operation further comprises producing the conversion value by performing the truncation operation for the exclusive disjunction by the run sequence in accordance with the following equation:

$$\alpha_S = \mathrm{Trunc}(\alpha', r_n)$$

where $\alpha_S$ denotes the conversion value, and $\alpha'$ denotes the exclusive disjunction; and
performing the predetermined conversion operation further comprises producing the conversion key by performing the truncation operation for the rotation key by the run sequence in accordance with the following equation:

$$X_S = \mathrm{Trunc}(X', r_n)$$

where $X_S$ denotes the conversion key.

14. The method of claim 13, wherein producing the authentication response random number comprises producing the authentication response random number so that a scalar product of the authentication response random number and the conversion key is equal to a scalar product of the conversion value, the conversion key and a noise vector in accordance with the following equation:

$$\alpha_S \cdot X_S \oplus V = \beta \cdot X_S$$

where V denotes the noise vector, and $\beta$ denotes the authentication response random number.

15. A reader for authenticating a tag in a radio frequency identification system sharing a predetermined secret key, the reader comprising:
a memory unit configured to store the predetermined secret key;
a communication unit configured to perform an RF communication function with the tag; and
a control unit configured to transmit the authentication request random number to the tag, to generate the PN sequence formed of a series of binary codes from the exclusive disjunction of the authentication request random number and the predetermined secret key, and to authenticate the tag by analyzing the PN sequence and an authentication response random number when receiving the authentication response random number produced by performing a predetermined conversion operation for the PN sequence from the tag.

16. The reader of claim 15, wherein the control unit authenticates the tag by performing the predetermined conversion operation for the PN sequence and performing a comparison with the authentication response random number.

17. The reader of claim 16, wherein the control unit comprises:
a sequence generation part configured to generate the PN sequence and to generate a run sequence by counting at least one run code which indicates a continuous arrangement of a same binary code in the PN sequence; and
a calculation part configured to convert the exclusive disjunction and the predetermined secret key into a conversion value and a conversion key, respectively, by performing the predetermined conversion operation together with the run sequence.

18. The reader of claim 17, wherein the sequence generation part is further configured to generate the PN sequence by applying the exclusive disjunction to a Linear Feedback Shift Register (LFSR) function.

19. The reader of claim 17, wherein the predetermined conversion operation comprises a rotation operation, and wherein the calculation part is further configured to produce a rotation key by performing the rotation operation for the predetermined secret key by the run sequence in accordance with the following equation:

$$X'=Rot(X, r_n)$$

where X' denotes the rotation key, X denotes the predetermined secret key, and $r_n$ denotes the run code.

20. The reader of claim 19, wherein:
the predetermined conversion operation further comprises a truncation operation;
the calculation part is further configured to produce the conversion value by performing the truncation operation for the exclusive disjunction by the run sequence in accordance with the following equation:

$$\alpha_S=Trunc(\alpha', r_n)$$

where $\alpha_S$ denotes the conversion value, and $\alpha'$ denotes the exclusive disjunction; and
the calculation part is further configured to produce the conversion key by performing the truncation operation for the rotation key by the run sequence in accordance with the following equation:

$$X_S=Trunc(X', r_n)$$

where $X_S$ denotes the conversion key.

21. The reader of claim 20, wherein the tag produces the authentication response random number so that a scalar product of the authentication response random number and the conversion key is equal to a scalar product of the conversion value, the conversion key and a noise vector in accordance with the following equation:

$$\alpha_S \cdot X_S \oplus V = \beta \cdot X_S$$

where V denotes the noise vector, and $\beta$ denotes the authentication response random number.

22. The reader of claim 21, wherein the control unit further comprises a comparison part configured to check whether the scalar product of the conversion value and the conversion key is equal to the scalar product of the authentication response random number and the conversion key in accordance with the following equation:

$$\alpha_{X'} \cdot X_S = \beta \cdot X_S.$$

23. A tag for authentication to reader in a radio frequency identification system sharing a predetermined secret key, the tag comprising:
a memory unit configured to store the predetermined secret key;
a communication unit configured to perform an RF communication function with the reader; and
a control unit configured to generate a Pseudorandom Noise (PN) sequence formed of a series of binary codes from an exclusive disjunction of an authentication request random number and the predetermined secret key when receiving the authentication request random number from the reader, to produce an authentication response random number by performing a predetermined conversion operation for the PN sequence, and to transmit the authentication response random number to the reader.

24. The tag of claim 23, wherein the control unit comprises:
a sequence generation part configured to generate the PN sequence and to generate a run sequence by counting at least one run code which indicates a continuous arrangement of a same binary code in the PN sequence; and
a calculation part configured to convert the exclusive disjunction and the predetermined secret key into a conversion value and a conversion key, respectively, by performing the predetermined conversion operation together with the run sequence.

25. The tag of claim 24, wherein the sequence generation part is further configured to generate the PN sequence by applying the exclusive disjunction to a Linear Feedback Shift Register (LFSR) function.

26. The tag of claim 24, wherein the predetermined conversion operation comprises a rotation operation, and wherein the calculation part is further configured to produce a rotation key by performing the rotation operation for the predetermined secret key by the run sequence in accordance with the following equation:

$$X'=Rot(X, r_n)$$

where X' denotes the rotation key, X denotes the predetermined secret key, and $r_n$ denotes the run code.

27. The tag of claim 26, wherein:
the predetermined conversion operation further comprises a truncation operation;
the calculation part is further configured to produce the conversion value by performing the truncation operation for the exclusive disjunction by the run sequence in accordance with the following equation:

$$\alpha_S=Trunc(\alpha', r_n)$$

where $\alpha_S$ denotes the conversion value, and $\alpha'$ denotes the exclusive disjunction; and
the calculation part is further configured to produce the conversion key by performing the truncation operation for the rotation key by the run sequence in accordance with the following equation:

$$X_S=Trunc(X', r_n)$$

where $X_S$ denotes the conversion key.

28. The tag of claim 27, wherein the control unit further comprises an output part configured to produce the authentication response random number so that a scalar product of the authentication response random number and the conversion key is equal to a scalar product of the conversion value, the conversion key and a noise vector in accordance with the following equation:

$$\alpha_S \cdot X_S \oplus V = \beta \cdot X_S$$

where V denotes the noise vector, and $\beta$ denotes the authentication response random number.

* * * * *